US010405256B2

(12) United States Patent
Yan et al.

(10) Patent No.: US 10,405,256 B2
(45) Date of Patent: Sep. 3, 2019

(54) TECHNIQUE FOR ACCESS BY A MASTER DEVICE TO A VALUE TAKEN BY A CHARACTERISTIC MANAGED BY A PERIPHERAL DEVICE

(71) Applicant: ORANGE, Paris (FR)

(72) Inventors: Han Yan, Puteaux (FR); Fabrice Fontaine, Geveze (FR)

(73) Assignee: ORANGE, Paris (FR)

( * ) Notice: Subject to any disclaimer, the term of this patent is extended or adjusted under 35 U.S.C. 154(b) by 111 days.

(21) Appl. No.: 15/512,046

(22) PCT Filed: Sep. 29, 2015

(86) PCT No.: PCT/FR2015/052596
§ 371 (c)(1),
(2) Date: Mar. 16, 2017

(87) PCT Pub. No.: WO2016/051074
PCT Pub. Date: Apr. 7, 2016

(65) Prior Publication Data
US 2017/0311223 A1    Oct. 26, 2017

(30) Foreign Application Priority Data

Sep. 30, 2014  (FR) ..................................... 14 59280

(51) Int. Cl.
*H04W 40/22*   (2009.01)
*H04W 8/00*    (2009.01)
(Continued)

(52) U.S. Cl.
CPC ......... *H04W 40/22* (2013.01); *H04L 12/2803* (2013.01); *H04W 4/80* (2018.02);
(Continued)

(58) Field of Classification Search
None
See application file for complete search history.

(56) References Cited

U.S. PATENT DOCUMENTS

| 5,949,776 A * | 9/1999 | Mahany et al. ............... 370/338 |
| 2011/0069611 A1 * | 3/2011 | Chung .................. H04W 40/32 370/225 |

(Continued)

FOREIGN PATENT DOCUMENTS

| GB | 2512256 A | 9/2014 |
| WO | 2013086036 A1 | 6/2013 |

(Continued)

OTHER PUBLICATIONS

International Search Report from PCT/FR2015/052596.
(Continued)

*Primary Examiner* — George C Atkins
(74) *Attorney, Agent, or Firm* — Haverstock & Owens LLP

(57) ABSTRACT

The invention relates to a technique for access by a master device (22) to a value. The invention relates to a technique for access by a master device (22) to a value taken by a characteristic managed by a peripheral device (23). A first relay device (21) situated in a zone of radio coverage of the master device receives a command for simulation of the peripheral device, this peripheral device being situated in a zone of radio coverage to a second relay device (24). The first relay device then establishes a radio connection with the master device, by simulating the presence of the peripheral device in the zone of radio coverage of the master device. The first relay device receives from the master device a request to read a value taken by a characteristic managed by the peripheral device, transmits the request and receives in return the value from the second relay device, said second
(Continued)

relay device having obtained it by interrogating the peripheral device. It can then dispatch it to the master device.

16 Claims, 4 Drawing Sheets

(51) Int. Cl.
| | | |
|---|---|---|
| *H04W 16/26* | (2009.01) | |
| *H04W 4/00* | (2018.01) | |
| *H04W 84/12* | (2009.01) | |
| *H04W 4/80* | (2018.01) | |
| *H04L 12/28* | (2006.01) | |
| *H04W 52/02* | (2009.01) | |
| *H04W 84/18* | (2009.01) | |
| *H04W 28/02* | (2009.01) | |

(52) U.S. Cl.
CPC .......... *H04W 8/005* (2013.01); *H04W 16/26* (2013.01); *H04W 52/0229* (2013.01); *H04W 52/0245* (2013.01); H04W 28/0215 (2013.01); H04W 84/12 (2013.01); H04W 84/18 (2013.01); Y02D 70/00 (2018.01); Y02D 70/142 (2018.01); Y02D 70/144 (2018.01); Y02D 70/26 (2018.01); Y02D 70/39 (2018.01)

(56) References Cited

U.S. PATENT DOCUMENTS

| | | |
|---|---|---|
| 2011/0161111 A1 | 6/2011 | Dicks et al. |
| 2014/0121473 A1 | 5/2014 | Banet et al. |
| 2014/0159877 A1 | 6/2014 | Huang |
| 2014/0167928 A1 | 6/2014 | Burd et al. |
| 2015/0351336 A1* | 12/2015 | Gilbert .................. A01G 22/00 700/284 |
| 2016/0344670 A1* | 11/2016 | Wu ......................... H04L 51/14 |

FOREIGN PATENT DOCUMENTS

| | | | | |
|---|---|---|---|---|
| WO | WO-2013/086036 A1 * | 6/2013 | ............ | H05B 33/08 |
| WO | WO-2013086036 A1 * | 6/2013 | ............ | H04M 3/00 |

OTHER PUBLICATIONS

French Search Report from FR1459280.
Attached please find written opinion for the PCT/FR2015/052596 application.

* cited by examiner

TECHNIQUE FOR ACCESS BY A MASTER DEVICE TO A VALUE TAKEN BY A CHARACTERISTIC MANAGED BY A PERIPHERAL DEVICE

The invention pertains to the general field of telecommunications.

The invention relates more particularly to a technique for access by a master device to a value taken by a characteristic managed by a peripheral device. For this purpose, two relay devices cooperate in a service area of a local area network. One of the two relay devices is in touch with the master device and the other relay device is in touch with the peripheral device.

A residential network comprises equipment or devices located in a customer site. These devices are also called CPE, for "Customer Premise Equipment". For a local area network, these are in particular an access gateway, a "Set-Top-Box" TV decoder, a mobile terminal. In the context of a home-automation network, these are also household appliances, alarm systems, sensors. Time access gateway enables the devices of the residential network to access a WAN wide area communication network, such as the Internet network.

These devices are for example mobile terminals, such as intelligent terminals ("smartphones") or tablets. Once connected to an access point, they can thus receive data originating from the other devices of the local area network or else from devices connected to the wide area communication network and dispatch data destined for a device of the local area network or connected to the wide area communication network.

An ever increasing number of connected objects, such as bracelets, watches, weighing scales, weather sensors, are also being offered to the public. These connected objects make it possible for example to collect data for a user or else for an environment. In order to limit the energy consumption of these connected objects, a low-consumption wireless network is used to transmit the collected data to a device endowed with processing capabilities. This is for example a BLE, for "Bluetooth Low Energy", technology radio access network.

The protocol implemented in a BLE access network operates in 2 phases:
- an advertisement phase where a BLE device of "peripheral" type, for example the connected object, regularly advertises its presence on the BLE access network by way of a frame "LE Advertising Report" which comprises in particular its BLE MAC address, its name and a power level of a received RSSI (for "Received Signal Strength Indication") radio signal;
- a GATT (for "Generic Attribute Profile") connection phase where a BLE device of "central" type connects to the peripheral device to collect more detailed information such as the name of the manufacturer, the level of the battery.

These connected objects are thus detected by a "central" or master BLE device. The latter can connect to the connected objects to collect their data (heart rate, number of paces performed, etc.). Thereafter, the master BLE device may optionally transmit this information by way of the Internet network to servers or else storage areas. This master BLE device is for example an intelligent terminal or telephone.

The radio range for this type of access network is very limited, of the order of ten meters for example inside a residence. The master BLE device must thus be situated in proximity to the "peripheral" BLE device. In the converse case, the peripheral BLE device, although present geographically in the local area network, is not accessible by the master BLE device, and its data cannot be collected or utilized by the latter.

One of the aims of the invention is to remedy inadequacies/drawbacks of the prior art and/or to afford improvements thereto.

According to a first aspect, the subject of the invention is a method of access by a master device to a value taken by a characteristic managed by a peripheral device in a local area network, said master and peripheral devices being able to communicate by a radio connection. The method comprises the following steps implemented by a first relay device situated in an area of radio coverage of the master device:
- reception of a command to simulate the peripheral device originating from a device of the local area network, said peripheral device being situated in an area of radio coverage of a second relay device;
- establishment of a radio connection with the master device, the first relay device simulating the presence of the peripheral device in the area of radio coverage of the master device;
- reception from the master device and by means of the radio connection of a request to read a value taken by a characteristic managed by the peripheral device;
- reception of said value originating from the second relay device, said second relay device having obtained it by interrogating the peripheral device, and
- dispatching of said value to the master device by means of the radio connection.

A peripheral device is a simple device, having only a low-consumption radio access module for communicating. The radio access technology complies for example with the "Bluetooth Low Energy" technology. The peripheral device is for example a sensor and is interrogatable only from a master device situated in its vicinity. By virtue of the implementation of the method, any master device present in a service area of the local area network can obtain a value of a characteristic that the peripheral device manages or measures.

No modification is required at the level of the peripheral device.

The relay devices are connected to the local area network, more precisely directly or indirectly to the access gateway. This entails for example electrical plugs with an Ethernet and/or PLC (for "Power Line Carrier") carrier current based connection and a radio access module of the same technology as the peripheral device.

The various embodiments or implementation characteristics mentioned hereinafter can be added independently or in combination with one another, in the steps of the access method such as is defined above.

In a particular embodiment, the first relay device receives an identifier of the characteristic, obtained by the second relay device from the peripheral device, and transmits it to the master device by means of the radio connection.

Once the connection has been established, the master device can obtain the profile of the characteristics managed by the peripheral device and select one of them. The master device can then store it for later interactions with the peripheral device. In another embodiment, the master device obtains it each time a connection is established. It is thus not necessary for the master device to store this profile.

In a particular embodiment, the method furthermore comprises a reception of an identifier of the peripheral device and, in order to establish a radio connection, the first relay device advertises the presence of the peripheral device in the area of radio coverage of the master device.

In a particular embodiment, the method comprises, for the second relay device, a listening for radio frequencies so as to detect the presence of the peripheral device and an advertising of the presence of the peripheral device.

Thus, it is possible to detect the presence in the service area of the local area network of the peripheral device.

In a particular embodiment, the first relay device advertises a presence of a plurality of peripheral devices detected in a service area of a local area network.

The presence of all the peripheral devices can be advertised in the local area network, the master device then selecting the peripheral device which it wishes to access. This makes it possible to steer the execution of the method from a user terminal.

In a particular embodiment, the first and second relay devices communicating by way of an access gateway of a local area network, the method furthermore comprises a command to one of the relay devices to listen for frequencies, so as to detect a presence of the peripheral device in a service area of the local area network.

On account of its central role in the local area network, the access gateway can steer the execution of the method by controlling the frequency listening phases. This makes it possible to limit the energy consumption of the relay devices.

According to a second aspect, the invention also relates to a first relay device in a local area network, said first relay device being situated in an area of radio coverage of a master device and comprising:
 a send and receive module, designed to receive a command to simulate the peripheral device originating from a device of the local area network, said peripheral device being situated in an area of radio coverage of a second relay device (24), and to receive a value taken by a characteristic managed by the peripheral device originating from the second relay device, said second relay device having obtained it by interrogating the peripheral device;
 a radio access module, designed to establish a radio connection with the master device by simulating the presence of the peripheral device in the area of radio coverage of the master device, to receive from the master device and by means of the radio connection a request to read a value taken by the characteristic and to dispatch the value in return.

The advantages stated in respect of the access method according to the first aspect are transposable directly to the relay device.

According to a third aspect, the invention also relates to a system in a local area network, said system comprising a first relay device according to the second aspect and a second relay device, said second relay device comprising:
 a radio access module, designed to obtain a value taken by the characteristic;
 a send and receive module, designed to receive a request to read a value taken by the characteristic originating from the first relay device and to dispatch the value to it.

The advantages stated in respect of the access method according to the first aspect are transposable directly to the system.

In a particular embodiment, the send and receive modules of the relay devices communicate by means of power line currents.

In a particular embodiment, the system furthermore comprises an access gateway, playing a role of intermediary between the two relay devices.

According to a fourth aspect, the invention relates to a program for a relay device, comprising program code instructions intended to control the execution of the steps of the access method according to the first aspect, when this program is executed by the relay device and a recording medium readable by a relay device on which a program for a device is recorded.

The advantages stated in respect of the access method according to the first aspect are transposable directly to the program for a relay device and to the recording medium.

The invention will be better understood with the aid of the following description of particular embodiments of the technique for accessing a data item, corresponding to a value taken by a characteristic, with reference to the appended drawings in which.

Figure 1:
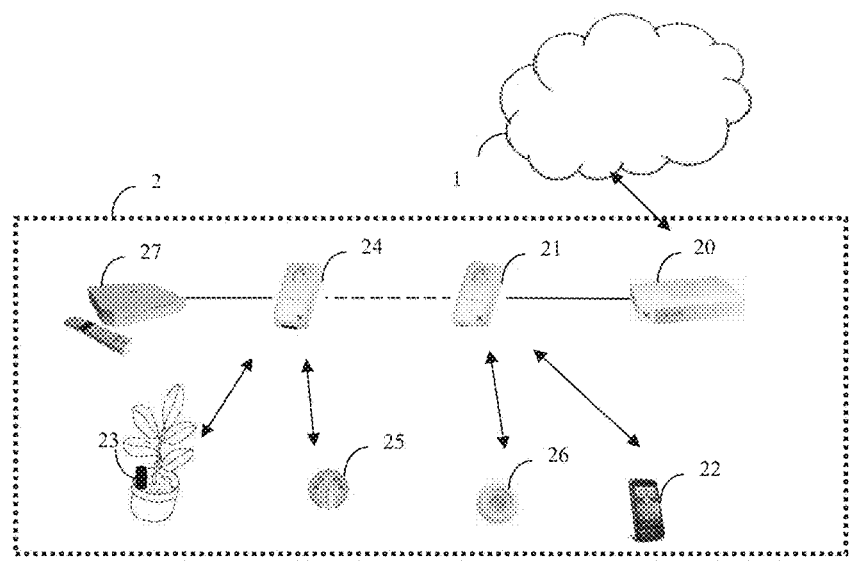
FIG. 1 represents an environment in which the technique for accessing a data item is implemented.

FIG. 1 represents, in its environment, a private or residential local communication network 2. An access gateway 20 enables devices of the local area network 2 to access a wide area communication network 1 or WAN, such as the Internet network.

The local area network relies on diverse network technologies, such as a wired network of Ethernet type according to IEEE standard 802.3, a wireless network of Wi-Fi type according to IEEE standard 802.11 or else a PLC power line current network (for example HomePlug®, Alliance HD-PLC) according to IEEE standard 1901, or else a network for coaxial cable of MoCA®, for "Multimedia over Coax", type.

The devices of the local area network 2 can be any devices, for example domestic, having a wired or wireless network connection. They may be for example a mobile terminal or telephone 22, PLC plugs 21, 24, a TV decoder 27 ("Set-Top Box"), a games console (not represented).

Such as represented in FIG. 1, the gateway 20 is connected by an Ethernet wired link according to IEEE standard 802.3 to the PLC plug 21. The latter communicates with the PLC plug 24 by means of a technology using power line carriers. This technology complies for example with IEEE specification 1901-2010, entitled "IEEE Std 1901-2010, IEEE Standard for Broadband over Power Line Networks: Medium Access Control and Physical Layer Specifications". At the network level, the exchanges between the access gateway 20 and the PLC plugs 21, 24 comply with the UPnP, for "Universal Plug and Play", network protocol promulgated by the UPnP forum. The aim of the UPnP standard is to enable devices to connect conveniently and to communicate simply within such a network. It constitutes a set of communication protocols based on the IP protocol (Internet Protocol, the basic protocol for networks of Internet type). To control the devices of the network, the UPnP protocol uses control points. In the embodiment described, the access gateway 20 is a control point of the local area network. A control point conventionally sends so-called discovery messages to the various devices of the local area network so as to obtain in return a description of the devices corresponding to the enquiry. These discovery messages are usually sent in point to multipoint mode of communication, also called multicast, from the control point to the devices. A terminal device compatible with the UPnP standard responds to these enquiry messages, and sends moreover, with regular frequency, presence messages to signify that it is active and connected to the network.

The TV decoder 27 is for its part connected to the PLC plug 24 by an Ethernet wired link and thus accesses the local area network. Once connected, the devices of the local area network can access the wide area communication network 1 by way of the access gateway 20.

A service area of the local area network corresponds to a geographical area in which the devices of the local area network can communicate directly or indirectly with the access gateway 20. This service area corresponds for example to a user's home residence. PLC plugs are disposed for example in each room of the residence.

In the service area of the local area network, other devices, termed peripheral devices, are also present. They are for example a smoke detector 25, household appliances (not represented), a sensor 26, a plant sensor 23. These various peripheral devices are designed to communicate on a radio access network and each comprise a radio access module.

The radio access module is of low-consumption radio type according to an access technology, such as Bluetooth® Low Energy BLE. This BLE access technology is defined by a Bluetooth SIG standardization group in the form of a set of documents, named "Bluetooth Core Specification 4.1".

In the embodiment described, the PLC plugs 21, 24 are also designed to communicate on the radio access network and each comprise a radio access module of low-consumption type according to the BLE access technology. These PLC plugs play a role of relay in relation to the master and peripheral devices during the implementation of the method described later. These PLC plugs are thus also called relay devices.

The smoke detector 25 and the plant sensor 23 are situated in an area of radio coverage of the PLC plug 24. The sensor 26 and the mobile telephone 22 is situated in an area of radio coverage of the PLC plug 21. The size of these coverage areas depends on the radio technology used and on the environment. For a BLE technology, these coverage areas are of the order of about ten meters. The plant sensor 23 is positioned in the earth of a plant and makes it possible to measure various characteristics such as an amount of fertilizer, an amount of moisture of the ground, a temperature and a luminosity, in real time. An application executing on the mobile telephone 22 makes it possible to collect the values of these various characteristics when the mobile telephone 22 is situated in proximity to the plant sensor 23. The mobile telephone 22 thus plays the role of the master device and the plant sensor 23 that of the peripheral device. On account of the radio technology of BLE type, the maximum distance between master and peripheral devices is of the order of ten meters.

The access gateway 20 can also have a radio access module of Wi-Fi type. It then offers access to the wide area communication network 1 to devices situated in an area of radio coverage (not represented in FIG. 1). The access gateway 20 thus communicates with devices which are located in its area of radio coverage by way of a wireless connection, for example with the mobile telephone 22.

It is recalled here that the local area network represented in FIG. 1 corresponds to an exemplary embodiment. No limitation is attached to the number of relay devices, of master devices, of peripheral devices, nor to the types of these devices.

Figure 2A:
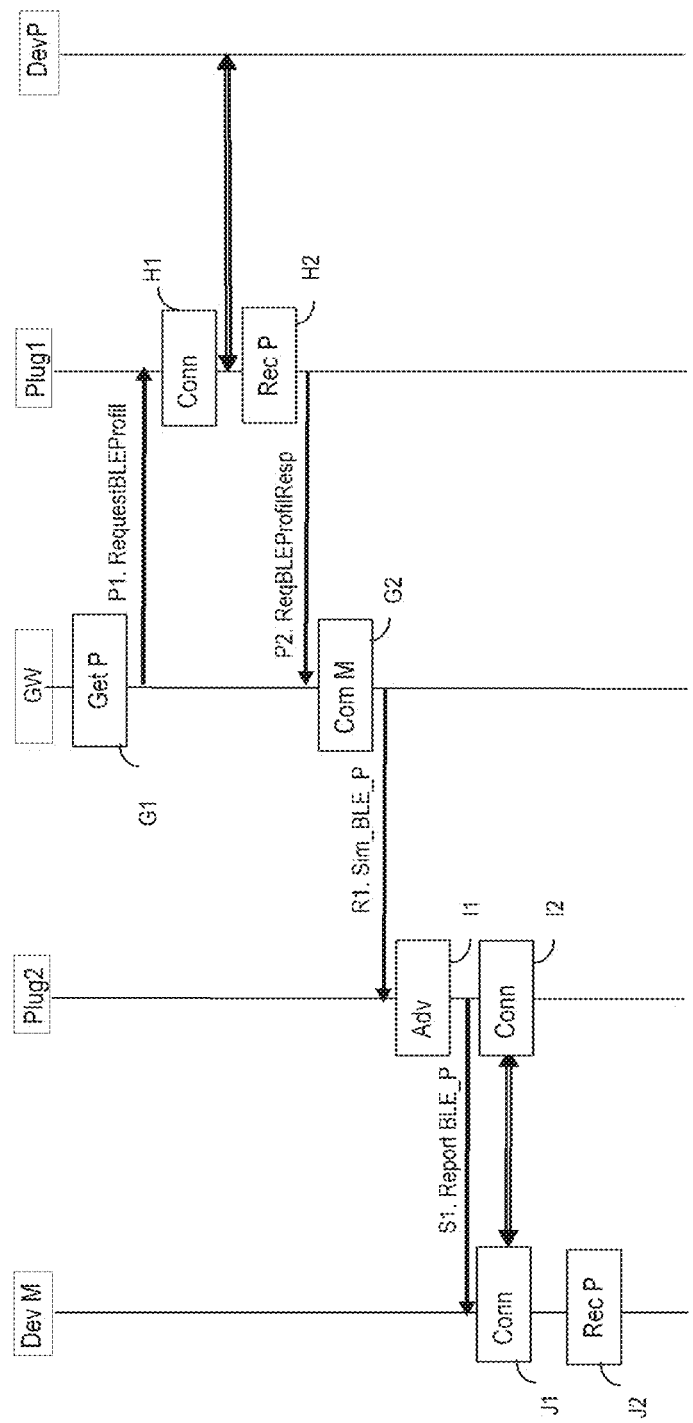
FIG. 2a illustrates steps of a method of accessing a data item according to a particular embodiment.
Figure 2B:
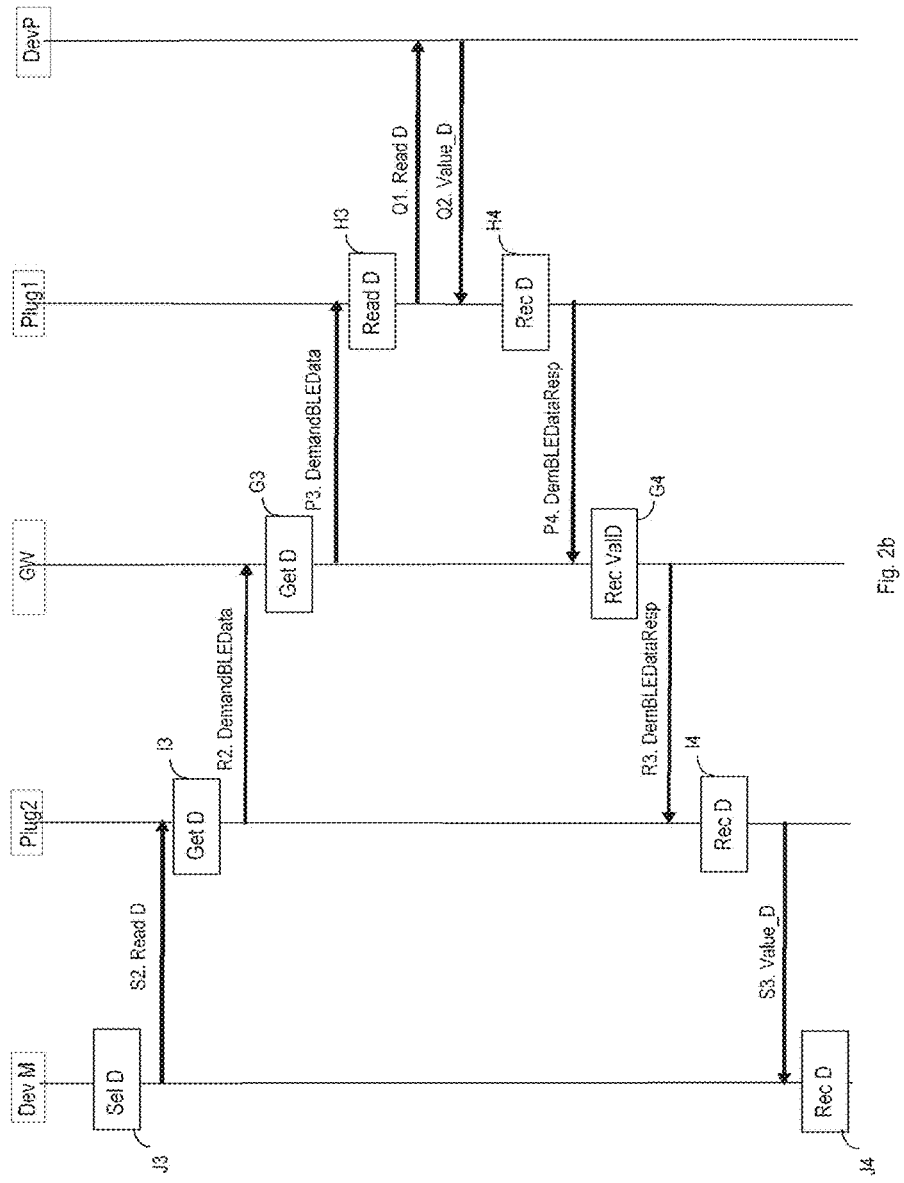
FIG. 2b illustrates other steps of the access method according to a particular embodiment.

We shall now describe, in conjunction with FIGS. 2a and 2b, the technique for accessing, implemented by the relay devices 21, 24 in collaboration with the access gateway 20, a data item corresponding to a value taken by a characteristic, in a service area of a local area network in particular embodiments. The steps are described subsequently for the PLC plug 21 as a relay device in conjunction with the master device (i.e. the mobile telephone 22) and for the PLC plug 24 as a relay device in conjunction with the peripheral device (i.e. the plant sensor 23). In the embodiment described, the access gateway 20 plays a role of intermediary between the two relay devices and comprises a presence database, designed to store the peripheral device or devices present in the service area of the local area network. For a peripheral device present in the service area, the database comprises the name of the peripheral device ("Local Name"), an address, for example the MAC address, and an identifier of the relay device making it possible to reach it. The 111 name of the peripheral device "Local Name" can take the values "Shortened Local Name" and "Complete Local Name". It makes it possible to identify the peripheral device simply. The identifier of the relay device corresponds for example to a unique universal identifier UUID (for "Universally Unique Identifier").

In what follows, the assumption is made that the peripheral device 23 has advertised its presence and the database comprises the data relating to its presence.

The messages exchanged between the relay device 24 and the peripheral device 23 and between the relay device 21 and the master device 22 comply with the BLE protocol.

The messages exchanged between the access gateway 20 and the relay devices 21, 24 comply with the UPnP protocol. These various devices implement a BLE discovery service called "urn:schemas-upnp-org:service:blediscovery:1". The SSDP protocol makes it possible to discover services offered on a network, such as the blediscovery service. The SSDP protocol is defined by the IETF in a document draft-cai-ssdp-v1-03.txt "Simple Service Discovery Protocol/1.0 Operating without an Arbiter" of October 1999, The relay device 21 advertises its presence on the local area network by broadcasting an SSDP protocol notification message NOTIFY "ssdp:alive". The relay device 21 advertises that it offers the blediscovery discovery service. The identifier of the relay device corresponds for example to a unique universal identifier UUID (for "Universally Unique Identifier"). The access gateway is thus informed of the services and of the relay devices which are present in the local area network.

Example of Notification Message Dispatched by the Relay Device to Publish the Presence of the Blediscovery Service NOTIFY * HTTP/1.1
HOST: 239.255.255.250:1900
CACHE-CONTROL: max-age = seconds until advertisement expires
LOCATION: URL for UPnP description for root device
NT: urn:schemas-upnp-org:service:blediscovery:1
NTS: ssdp:alive
SERVER: OS/version UPnP/1.0 product/version
USN: advertisement UUID Example of Message Enabling the Access Gateway to Detect the Presence of the Blediscovery Service:

```
M-SEARCH * HTTP/1.1
HOST: 239.255.255.250:1900
MAN: "ssdp:discover"
MX: seconds to delay response
ST: urn:schemas-upnp-org:service:blediscovery:1
```

FIG. 2*a* represents steps of the access method in a phase of obtaining the profile of the peripheral device.

In a step G1, the access gateway 20 dispatches a RequestBLEProfile command P1 to the relay device 24, commanding the relay device 24 to connect to the peripheral device 23 and to obtain a GATT profile ("Generic Attribute Profile"). The peripheral device 23 is identified by its address, for example its MAC address, stored in the presence database. It is recalled here that the GATT profile is organized hierarchically into sections, called services, which group together data called characteristics. A characteristic can correspond for example to the battery level, to the amount of moisture, to the amount of luminosity, to the number of paces performed by a user, etc. A characteristic is identified by a unique universal identifier UUID (for "Universally Unique Identifier"). Such a RequestBLEProfile request is for example is a message of the SOAP (for "Simple Object Access Protocol") protocol layer in a UPnP network and forms part of the BLE discovery service "blediscovery" described previously. The SOAP protocol makes it possible in a UPnP network to invoke actions.

Example of Profile Request Message

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:blediscovery:1#RequestBLEProfile"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:RequestBLEProfile
xmlns:u="urn:schemas-upnp-org:service:blediscovery:1">
    <CompleteLocalName>Flex</CompleteLocalName>
    <MACAddress>F8:C7:2D:CB:0A:22</MACAddress>
    <MACAddressType>RANDOM</MACAddressType>
</u:RequestBLEProfile>
</s:Body>
</s:Envelope>
```

It will be noted that these XML ("eXtended Markup Language") data constitute only one example of description data and that the invention can also apply to description data complying with another standard, such as the COAP protocol (for "Constrained Application Protocol"), the Alljoyn protocol defined by the Allseen Alliance.

This command P1 is received by the relay device 24 in a step H1. The relay device 24 then establishes a connection with the peripheral device 23 identified according to the mechanism defined by Bluetooth LE. This connection is symbolized in FIG. 2*a* by a double arrow between the relay device 24 and the peripheral device 23. Next, in a step H2, the relay device 24 receives the GATT profile of the peripheral device 23 and transfers it to the access gateway 20 in a response message P2 RequestBLEProfileResponse.

The GATT profile is received by the access gateway 20 in a step G2. Such a response RequestBLEProfileResponse complies for example with the UPnP protocol and forms part of the "blediscovery" listening control service described previously.

Example of Response Message for a Plant Sensor

```
HTTP/1.1 200 OK
CONTENT-LENGTH: bytes in body
CONTENT-TYPE: text/xml; charset="utf-8"
DATE: when response was generated
EXT:
SERVER: OS/version UPnP/1.0 product/version
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:RequestBLEProfileResponse xmlns:u="urn:schemas-upnp-org:service:blediscovery:1">
<Profile xsi:noNamespaceSchemaLocation="http://schemas.bluetooth.org/Documents/profile.xsd"
xmlns:xsi="http://www.w3.org/2001/XMLSchema-instance"
type="org.bluetooth.profile.plant_care" name="Plant Care">
    <InformativeText>
        <Abstract> abstract </Abstract>
        <Summary> summary </Summary>
    </InformativeText>
    <Role name="Plant Care Sensor">
    <Service type="org.bluetooth.service.plant_care"/>
    <Service type="org.bluetooth.service.device_information">
        <Characteristic>
            <Type>"org.bluetooth.characteristic.manufacturer_name_string"</Type>
            <Uuid>2a29</Uuid>
        </Characteristic>
        <Characteristic>
            <Type>"org.bluetooth.characteristic.model_number_string"</Type>
            <Uuid>2a24</Uuid>
        </Characteristic>
```

```
        <Characteristic>
            <Type>"org.bluetooth.characteristic.system_id"</Type>
            <Uuid>2a23</Uuid>
        </Characteristic>
    </Service>
</Profile>
</u:RequestBLEProfileResponse>
</s:Body>
</s:Envelope>
```

Still in this step G2, the access gateway 20 dispatches a simulation command message R1 to the relay device 21 instructing simulation of the presence of the peripheral device 23. Such a simulation command comprises in particular the name of the peripheral device 23, the MAC address and the GATT profile of the peripheral device 23.

This command message R1 is received by the relay device 21 in a step I1. Still in this step I1, the relay device 21 signals itself to the master device 22 and transmits a message S1-Report on one of the frequencies dedicated to frequency listening. This frequency listening is generally known by the term "scan" and makes it possible to detect the presence of peripheral devices. This message S1 corresponds to an advertisement message "LE Advertising Report", also defined in this Bluetooth specifications document. The relay device 21 simulating the peripheral device 23, the message S1 comprises the name of the peripheral device 23, the MAC address of the peripheral device 23 and a data item representative of an RSSI ("Received Signal Strength Indication") radio signal. When frequency listening is active, this message S1 comprises an "Event_Type" element equal to "Scan Response". In the converse case (passive listening), this message S1 comprises an "Event_Type" element equal to "connectable (undirected/directed) advertising".

This advertisement message S1 is received by the master device 22 in a step J1. The master device 22 then establishes a connection with the relay device 21 (simulating the peripheral device 23) according to the mechanism defined by Bluetooth LE. This connection is symbolized in FIG. 2a by a double arrow between the relay device 21 and the master device 22. Next, in a step I2, the relay device 21 dispatches the GATT profile of the peripheral device 23 to the master device 22. The GATT profile is received by the master device 22 in a step J2.

In a particular embodiment, these exchanges relating to the GATT profile are not implemented, the master device already having the latter (for example because it received it upon a previous connection). The simulation command R1 then comprises solely the name of the peripheral device 23 and its MAC address.

FIG. 2b represents steps of the access method in a phase of obtaining a value taken by a characteristic managed by the peripheral device.

In a step J3, a characteristic is selected on the basis of the GATT profile received or stored. This selection is for example configured as a function of the type of peripheral device. It can also be performed by an application executing on the master device 22.

A read request S2 ("READ") in respect of the selected characteristic is then dispatched to the relay device 21 by the master device 22.

In a step I3, the relay device 21 receives the read request S2 DemandBLEData and transmits to the access gateway 20 a read message R2 in respect of the selected characteristic identified by its unique universal identifier. Such a DemandBLEData request complies for example with the UPnP protocol and forms part of the BLE discovery service "blediscovery" described previously.

Example of Characteristic Request Message (Batter Level)

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:blediscovery:1#DemandBLEData"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:DemandBLEData
xmlns:u="urn:schemas-upnp-org:service:blediscovery:1">
    <CompleteLocalName>Flex</CompleteLocalName>
    <MACAddress>F8:C7:2D:CB:0A:22</MACAddress>
    <MACAddressType>RANDOM</MACAddressType>
    <Characteristic>2a19</Characteristic>
</u:DemandBLEData >
</s:Body>
</s:Envelope>
```

In a step G3, a command P3 DemandBLEData is then dispatched from the access gateway 20 to the relay device 24, commanding the latter to obtain a value of the selected characteristic.

This command P3 is received by the relay device 24 in a step H3. The relay device 24 then dispatches a read request Q1 ("READ") in respect of the value of this characteristic.

In the course of a step H4, the relay device 24 receives this value in a message Q2 and transfers it to the access gateway 20 in a message P4 DemandBLEDataResponse.

The message P4 is received by the access gateway 20 in a step G4 and a corresponding message R3 DemandBLE-DataResponse is dispatched to the relay device 21 by the access gateway 20.

In a step I4, the relay device 21 (simulating the peripheral device 23) responds to the read request received in step I3 by dispatching the value of the requested characteristic.

Thus, the master device 22 can obtain a value taken by a characteristic measured or managed by the peripheral device 23, whatever their respective locations in the service area of the local area network.

When the master device 22 no longer has any read request to be transmitted, the various connections established can be released so as to limit the energy consumption of the devices.

The sequencing of the various above-described steps may be different in other embodiments. The relay device 21 may for example simulate the presence of several peripheral devices detected by the relay device 24. Steps H1 and H2 are then executed when the master device 22 initiates a connection with the relay device 21, the latter playing the role of one of the peripheral devices.

The steps of the access method have been described for an embodiment in which the access gateway 20 plays a role of intermediary between the relay devices that are disposed in the service area of the local area network. In this respect, the access gateway 20 comprises a presence database, designed to store the peripheral device or devices present in the service area of the local area network.

In another embodiment, the relay devices talk to one another directly without any intermediary. The presence database is then distributed between the various relay devices, each of them obtaining the presence data for the peripheral devices located in its interaction area. A relay device can then simulate the presence of the whole set of peripheral devices detected by another relay device.

The steps described above rely on the implementation of a protocol between a device of the local area network (the access gateway or else a PLC plug) implementing the IP protocol and the PLC plug also implementing the IP protocol and the BLE protocol. The protocol defined makes it possible in particular by way of the IP interface:

- to control a relay device so that it establishes a connection with a peripheral BLE device so as to obtain initially a GATT profile, and subsequently a value taken by a characteristic;
- for the relay device to transmit data received by the BLE protocol,
- to request a relay device to simulate the presence of the peripheral BLE device so as to publish data received under BLE from this peripheral device.

In the embodiment described, the radio access modules of the relay devices are in an "activated" state of activation, that is to say in operation. In the context of energy savings, the UPnP forum has defined the so-called "Energy Management" profile in the specification "EnergyManagement for UPnP 1.0" of 30 Aug. 2013 which enables devices to publish the list of their network interfaces (name, description, physical address, network address, type, etc.) and in particular the status of the interfaces (active, deactivated without automatic wakeup, deactivated with periodic wakeup, etc.) and the wakeup scheme to be used to release them from a sleeping state. In another particular embodiment, the radio access modules of the PLC plugs 21, 24 are activatable and deactivatable remotely by the access gateway 20. A state of activation is associated with each radio access module and can take an "activated" or "deactivated" value. The state of activation of the module is "deactivated" following a switch to a sleeping state or else a powering down of the module.

An example of a description table for one or more devices of the network and their interfaces is provided hereinbelow in the context of the "Energy Management" UPnP standard; the PLC plug is represented in XML description syntax, assuming that it has a Bluetooth LE interface.

Example of Description of a PLC Plug:

```
<?xml version="1.0" encoding="UTF-8"?>
<NetworkInterfaceInfo
xsi:schemaLocation="urn:schemas-upnp-org:lp:emNetworkInterfaceInfo
http://www.upnp.org/schemas/lp/emNetworkInterfaceInfo.xsd"
xmlns="urn:schemas-upnp-org:lp:em
NetworkInterfaceInfo"
xmlns:xsi="http://www.w3.org/2001/XMLSchema-instance">
    <DeviceInterface>
        <DeviceUUID>uuid:
00000000-0000-1010-8000-4424991A912</DeviceUUID>
        <FriendlyName>Plug PLC1</FriendlyName>
        <NetworkInterface>
```

-continued

```
            <SystemName>ble0</SystemName>
            <Description>Bluetooth LE</Description>
            <MacAddress>54:42:49:91:A9:12</MacAddress>
            <InterfaceType>BLE</InterfaceType>
            <NetworkInterfaceMode>BLE-down-with-UPnPWakeOn
            </NetworkInterfaceMode>
            <MaxWakeOnDelay>5</MaxWakeOnDelay>
        </NetworkInterface>
    </DeviceInterface>
</NetworkInterfaceInfo>
```

This example file comprises a list of an interface (DeviceInterface), described between an opening tag <NetworkInterface> and a closing tag</NetworkInterface>.

The interface is of Bluetooth LE type (<Description>Bluetooth LE</Description>). It is inactive and activatable by a new UPnP message called "BLE-down-with-UPnPWakeOn". This interface is awoken upon reception of a message "X_WakeOn" on the IP interface.

The XML syntax of the file representative of the interfaces of the plug is globally in accordance with the "Energy Management" UPnP specification mentioned above, except as regards the following two elements:

- the "InterfaceType" tag makes it possible to specify a low-consumption interface, in our example of Bluetooth LE type;
- the "NetworkInterfaceMode" tag makes it possible to specify that an interface is deactivatable ("BLE-up-with-UPnPStandby") by a new UPnP message called "X_Standby", a possible syntax of which is proposed hereinbelow, or activatable ("BLE-down-with-UPnPWakeOn") via the message "X_WakeOn".

Example of Syntax for the Message X_Standby:

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:EnergyManagement:1#X_Standby"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_Standby
xmlns:u="urn:schemas-upnp-org:service:EnergyManagement:1">
<NetworkInterfaceSystemName>ble0</NetworkInterfaceSystemName>
</u:X_Standby>
</s:Body>
</s:Envelope>
```

Example of Syntax for the Message X_WakeOn:

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:EnergyManagement:1#X_WakeOn"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_WakeOn
xmlns:u="urn:schemas-upnp-org:service:EnergyManagement:1">
<NetworkInterfaceSystemName>ble0</NetworkInterfaceSystemName>
<u:X_WakeOn>
</s:Body>
</s:Envelope>
```

The various embodiments have been described with the aid of UPnP mechanisms and protocol. No limitation is attached to the use of the UPnP protocol. The various embodiments can also be implemented with a binary oriented protocol or else with the Alljoyn protocol. The binary oriented protocol is a communication protocol which transmits the data streams as a set of bits without semantics and relies on a messaging defined between two devices, a message comprising a type of message and parameters. This exhibits the advantage of limiting the bandwidth required for the implementation of the method between two devices.

By way of illustration, a case of use is described. Romain has a plant sensor planted in the earth of his orchid. This sensor contains temperature, moisture and luminosity sensors for the plants. The data collected by these sensors are thereafter dispatched to a mobile telephone or terminal by means of the BLE technology, when it is situated in an interaction area, of the order of ten meters.

At home Romain also has PLC plugs that he has placed on the ground floor in his lounge (PLC1) and upstairs in his office (PLC2). Romain has placed the orchid outside in proximity to the lounge so as to profit from a forecast change of weather. After a heavy shower, Romain wishes to check the amount of moisture collected by the sensor so as to decide to bring the orchid back in.

By virtue of the cooperation between the PLC plugs, the plug PLC1 obtains the amount of moisture from the plant sensor and transmits it to the plug PLC2. The latter simulates the plant sensor at the mobile terminal. Romain then knows whether or not he should go down and bring his plant back in.

Figure 2C:
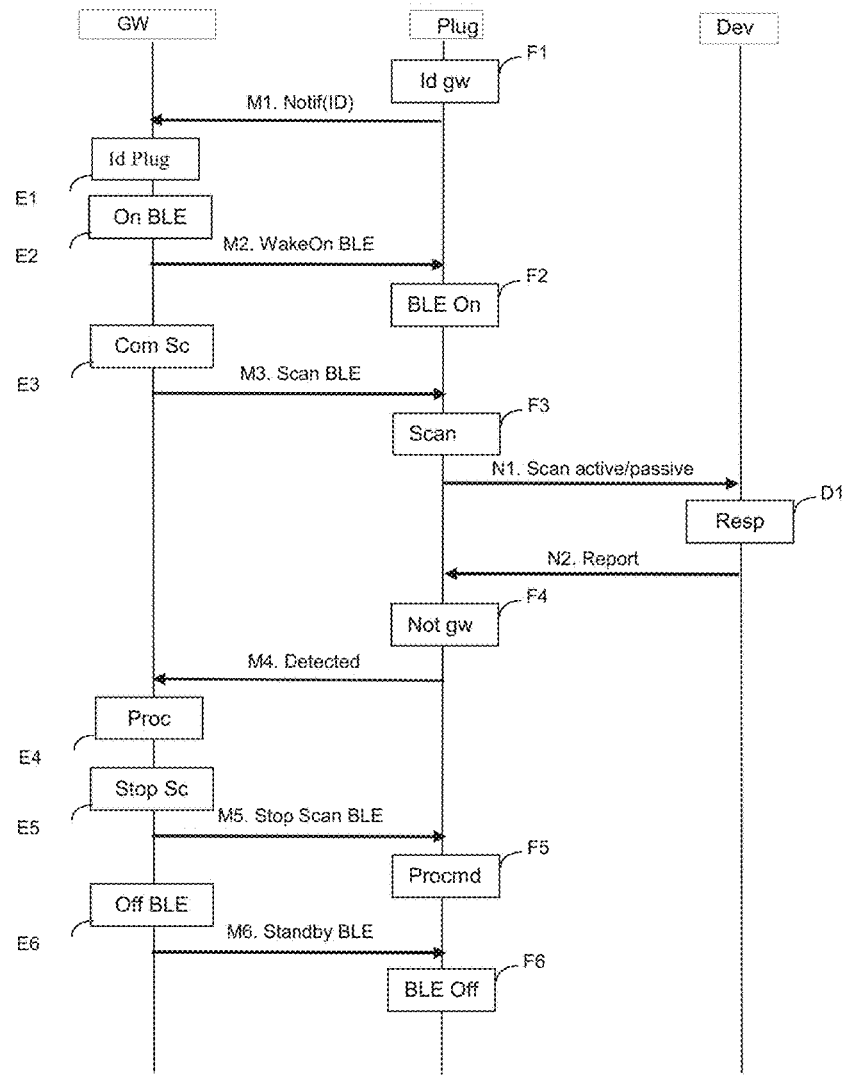
FIG. 2c illustrates other steps of the access method according to a particular embodiment.

FIG. 2c represents steps implemented by the access gateway 20, the relay devices 21, 24 to determine a presence of a peripheral device in the service area of the local area network. The steps are described subsequently for the PLC plug 21 as a relay device. Of course these steps are also implemented for the PLC plug 24.

In the initial state, the radio access module of the relay device 21 is in a "deactivated" state of activation, that is to say turned off or placed on standby.

In a step F1, the relay device 21 advertises its presence on the local area network by broadcasting a notification message M1-Notif. The message M1-Notif comprises an identifier of the relay device. The message M1 corresponds for example to an SSDP (for "Simple Service Discovery Protocol") protocol message NOTIFY "ssdp:alive". The relay device 21 advertises that it offers an energy management service "urn:schemas-upnp-org:service:EnergyManagement:1". The identifier of the relay device corresponds for example to a unique universal identifier UUID (for "Universally Unique Identifier").

Example of Notification Message Dispatched by the Relay Device to Publish the Presence of the EnergyManagement Service:

---

NOTIFY * HTTP/1.1
HOST: 239.255.255.250:1900
CACHE-CONTROL: max-age = seconds until advertisement expires
LOCATION: URL for UPnP description for root device
NT: urn:schemas-upnp-org:service:EnergyManagement:1
NTS: ssdp:alive
SERVER: OS/version UPnP/1.0 product/version
USN: advertisement UUID

---

In a step E1, the access gateway 20 receives the notification message N1 originating from the relay device 21. The access gateway 20 is thus informed of the services and of the relay devices which are present in the local area network.

In a step E2, the access gateway 20 commands an activation of the BLE radio access module of the relay device 21, that is to say bringing it into operation. This bringing into operation can correspond to exiting a sleeping state or else to a powering up of the module. The state of activation of the module is then "activated". This command is performed by dispatching a message M2-WakeOn BLE. The message M2 corresponds for example to the message X_WakeOn defined previously in an Energy Management UPnP context.

This command message M2 is received by the relay device 21 in a step F2 and the latter then activates its BLE radio access module.

In a step E3, the access gateway 20 commands the relay device 21 so that the latter executes a listening for access frequencies for the BLE radio access network. A command message M3-Scan BLE is transmitted by the access gateway 20 to the relay device 21. The message M3 corresponds for example to a UPnP message X_StartBLEScan.

Example of Syntax for the Message X_StartBLEScan:

---

POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:blediscovery:1#X_StartBLEScan"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_StartBLEScan
xmlns:u="urn:schemas-upnp-org:service:blediscovery:1">
<NetworkInterfaceSystemName>ble0</NetworkInterfaceSystemName>
</u:X_StartBLEScan>
</s:Body>
</s:Envelope>

---

In a particular embodiment, the message M3 comprises a first parameter d1 indicating a duration for which this frequency listening must be performed. In a particular embodiment alternative to or cumulative with the previous embodiment, the message M3 comprises a second temporal parameter d2 indicating the frequency at which this frequency listening must be performed. Thus, the access gateway 20 can command a frequency listening of d1 seconds every d2 seconds.

The access gateway 20 can thus command the listenings for BLE frequencies implemented by the relay device 21. This makes it possible to limit the energy consumption of the relay device 21. This frequency listening command E3 can be triggered in a regular manner by the access gateway 20. It can also be triggered following reception of an enquiry for obtaining a presence data item relating to a peripheral device.

In a step F3, the relay device 21 receives the command message M3 and if appropriate the associated temporal parameters and starts a listening for BLE frequencies. This frequency listening can be active, with a dispatching of a message N1 invoking the peripheral devices so that they signal themselves ("LE Set Scan Enable Command" defined in the specifications document "BLUETOOTH SPECIFICATION Version 4.1"), or passive.

In a step D1, the peripheral device 23 detects that it must signal itself to the relay device and transmits a message N2-Report on one of the frequencies dedicated to this listening. This message N2 corresponds to an advertisement message "LE Advertising Report", comprising in particular the name of the peripheral device ("Local Name"), an address, for example the MAC address, and a data item representative of an RSSI (Received Signal Strength Indication") radio signal.

This advertisement message N2 is received by the relay device 21 in a step F4. Still in this step F4, following reception of the advertisement message N2, the relay device 21 transmits a notification M4-Detected of detection of the peripheral device 23 to the gateway 20. The notification of detection M4 comprises for example the name of the peripheral device detected and/or the address of the peripheral device detected. In a particular embodiment, the notification of detection M4 is a message of the GENA (for "Generic Event Notification Architecture") protocol layer. The GENA protocol defined in the document of the IETF "draft-cohen-gena-p-base-01.txt" makes it possible in a UPnP network to advertise events through a subscription mechanism.
Example of GENA Notification

```
NOTIFY delivery path HTTP/1.1
HOST: delivery host:delivery port
CONTENT-TYPE: text/xml
CONTENT-LENGTH: Bytes in body
NT: upnp:event
NTS: upnp:propchange
SID: uuid:subscription-UUID
SEQ: event key
<?xml version="1.0"?>
<e:propertyset xmlns:e="urn:schemas-upnp-org:event-1-0">
    <e:property>
    <CompleteLocalName>Flex</CompleteLocalName>
    <MACAddress>F8:C7:2D:CB:0A:22</MACAddress>
    <MACAddressType>RANDOM</MACAddressType>
    <RSSI>-58</RSSI>
    </e:property>
</e:propertyset>
```

In another particular embodiment, the notification of detection M4 is an Alljoyn protocol message.

This notification of detection M4 is received by the access gateway 20 in a step E4. The peripheral device 23 is then identified as present in the service area of the local area network. This item of information in respect of presence of the peripheral device 23 is stored in the presence database.

The access gateway 20 can also store an identifier of the relay device 21 that detected the peripheral device 23.

In a step E5, the access gateway 20 commands the relay device 21 so that the latter stops the execution of listening for access frequencies for the BLE radio access network. A command message M5-Stop Scan BLE is transmitted by the access gateway 20 to the relay device 21. The message M5 corresponds for example to a UPnP message X_StopBLEScan.
Example of Syntax for the Message X_StopBLEScan:

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:blediscovery:1#X_StopBLEScan"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_StopBLEScan
xmlns:u="urn:schemas-upnp-org:service:blediscovery:1">
```

-continued

```
<NetworkInterfaceSystemName>ble0</NetworkInterfaceSystemName>
</u:X_StopBLEScan>
</s:Body>
</s:Envelope>
```

In a step F5, the relay device 21 receives the command message M5 and stops listening for BLE frequencies. This makes it possible to limit the energy consumption of the relay device 21 as well as the consumption on the peripheral devices which no longer have to respond to discovery enquiries.

In a step E6, the access gateway 20 commands a deactivation of the BLE radio access module of the relay device 21, that is to say placing it out of operation. This command is performed by dispatching a message M6-Standby BLE. The message M6 corresponds for example to the message X_Standby defined previously in an Energy Management UPnP context.

This command message M6 is received by the relay device 21 in a step F6 and the latter then deactivates its BLE radio access module. This makes it possible to limit the energy consumption of the relay device 21.

The embodiment has been described in a case where the presence of the peripheral device 23 is detected in step E4. The reception of a notification of presence M4 is monitored by a timeout. When this timeout expires, the access gateway 20 updates the list L of the peripheral devices present by adding those which have advertised themselves, deleting those which have not advertised themselves, modifying their location in case of change.

The embodiment described previously for the detection of a presence comprises various steps making it possible to optimize the energy consumption of the relay devices 21, 24. It is also possible to provide for other modes not offering this optimization. In a first variant, step E5 aimed at stopping the frequency listening is not implemented. The relay device 21 then performs frequency listening permanently as a function of the temporal parameters defined by the access gateway 20. In a second variant, step E6 of deactivating the BLE radio access module is not implemented. The BLE radio access network exists permanently at the level of the relay device 21.

The steps for the detection of presence have been described for an embodiment in which the access gateway 20 plays a role of intermediary between the relay devices, disposed in the service area of the local area network. In this respect, the access gateway 20 comprises a presence database, designed to store the peripheral device or devices present in the service area of the local area network. In another embodiment, the relay devices talk to one another directly without any intermediary, such as the access gateway. The presence database is then distributed between the various relay devices, each of them obtaining the presence data for the peripheral devices located in its interaction area.

Figure 3:
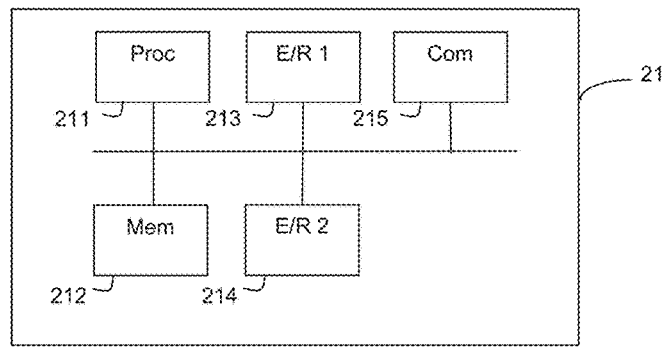
FIG. 3 represents a relay device according to a particular embodiment.

We shall now describe a relay device 21, 24 in a particular embodiment with reference to FIG. 3. Such a relay device is designed to cooperate with other relay device 24 in a service area of the local area network. It comprises in particular:
- a memory area 212, designed to store a program which comprises code instructions for implementing the steps of the access method such as described previously;
- a processor 211 for executing code instructions of software modules;
- a send/receive module 213, designed to communicate with another device of the local area network;

a radio access module 214;

a processing module 215, designed to execute a command received from the other relay device.

The radio access module 214 is designed to communicate on a radio access network.

The send/receive module 213 is for example an Ethernet interface module. It is in particular designed to receive a command to simulate the peripheral device originating from a device of the local area network, the peripheral device being situated in an area of radio coverage of another relay device 24, and to receive a value taken by a characteristic managed by the peripheral device originating from this other relay device, obtained by interrogating the peripheral device.

The radio access module 214 is designed to establish a radio connection with a master device 22 by simulating the presence of the peripheral device 23 in the area of radio coverage of the master device, to receive from the master device and by means of the radio connection a request to read a value taken by the characteristic and to dispatch the value in return.

It is stressed here that the relay device 21 can also comprise other interface modules, that are not represented in FIG. 3.

In a particular embodiment, the send/receive module 213 is furthermore designed to receive a command for activating the radio access module 214 of the relay device or a command for deactivating this radio access module.

In a particular embodiment, the send/receive module 213 communicates with the corresponding module of another relay device by means of power line currents.

In a particular embodiment, the radio access module 214 is designed to establish a radio connection with the peripheral device 23, to obtain a value taken by a characteristic and to dispatch the value in return.

Figure 4:
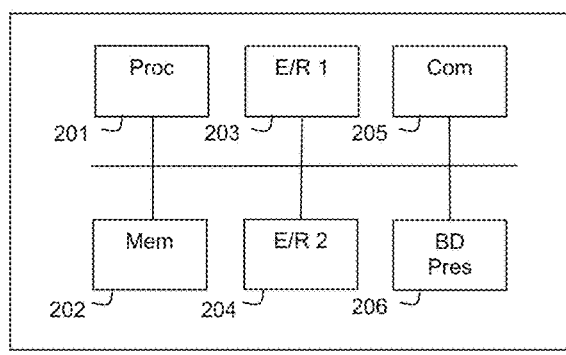
FIG. 4 represents an access gateway according to a particular embodiment.

We shall now describe with reference to FIG. 4 an access gateway 20 in a particular embodiment, in which the access gateway plays a role of intermediary. Such an access gateway enables at least one device of a local area network to access a wide area communication network and is designed to cooperate with a relay device so as to enable access to a value of a characteristic managed by a peripheral device 23. It comprises in particular:

a memory area 202, designed to store a program which comprises code instructions for implementing the steps of the access method such as described previously;

a processor 201 for executing code instructions of software modules;

a send/receive module 203, designed to dispatch data to the relay device and to receive same from the relay device;

an access module 204 for accessing the wide area communication network, a command module 205, designed to dispatch a command to the relay device;

a memory area 206, designed to store a list of peripheral devices that are present in the service area of the local area network.

It is stressed here that the access gateway 20 also comprises other processing modules, not represented in FIG. 4, designed to implement the various functions of an access gateway.

The send/receive module 203 is for example an Ethernet interface module. The send/receive module 203 is in particular designed to:

command the relay device situated in the area of radio coverage of the mobile telephone 22 to simulate the peripheral device situated in an area of radio coverage of another relay device 24, receive a request to read a value taken by a characteristic managed by the peripheral device originating from the relay device and dispatch this request to the other relay device;

receive the value from the other relay device, this other relay device having obtained it by interrogating the peripheral device, and dispatch the value to the relay device for transmission to the master device.

The access technique is implemented by means of software components and/or hardware components. In this regard, the term "module" can correspond in this document equally to a software component, or to a hardware component or to a set of hardware and/or software components, able to implement a function or a set of functions, according to what is described previously in respect of the module concerned.

A software component corresponds to one or more computer programs, one or more subprograms of a program, or more generally to any element of a program or of an item of software. Such a software component is stored in memory and then loaded and executed by a data processor of a physical entity and is liable to access the hardware resources of this physical entity (memories, recording media, communication buses, electronic input/output cards, user interfaces, etc.).

In the same manner, a hardware component corresponds to any element of a hardware set. It may or may not be a programmable hardware component, with or without integrated processor for the execution of software. It is for example an integrated circuit, a chip card, an electronic card for the execution of firmware, etc.

In a particular embodiment, the modules 213, 214, 215 are designed to implement the access method described previously. This preferably entails a software module comprising software instructions for executing the steps, implemented by a relay device, of the access method described previously. The invention therefore also relates to:

a program for a relay device, comprising program code instructions intended to control the execution of the steps of the access method described previously, when said program is executed by this relay device;

a recording medium readable by a relay device on which the program for a relay device is recorded.

In a particular embodiment, the modules 203, 204, 205 are designed to implement the access method described previously. This preferably entails a software module comprising software instructions for executing the steps, implemented by an access gateway, of the access method described previously. The invention therefore also relates to:

a program for an access gateway, comprising program code instructions intended to control the execution of the steps of the access method described previously, when said program is executed by this access gateway;

a recording medium readable by an access gateway on which the program for a gateway is recorded.

The software modules can be stored in or transmitted by a data medium. The latter can be a hardware storage medium, for example a CD-ROM, a magnetic recording means, for example a magnetic diskette or a hard disk. Moreover, the data medium can be a transmission medium such as an electrical, optical or radio signal, which can be conveyed via an electrical or optical cable, by radio or by other means. The program code instructions can be in particular downloaded from a network of Internet type.

Alternatively, the data medium can be an integrated circuit in which the program is incorporated, the circuit being adapted to execute or to be used in the execution of the determining method described previously.

The invention also relates to a system in a local area network 2, this system comprising a relay device such as described previously and another relay device, comprising a radio access module, designed to obtain a value taken by the characteristic, and a send and receive module, designed to receive a request to read a value taken by the characteristic originating from the relay device and to dispatch the value to it.

In a particular embodiment, the system furthermore comprises the access gateway described previously.

The invention claimed is:

1. A method of access by a master device to a value taken by a characteristic managed by a peripheral device in a local area network, said master and peripheral devices being able to communicate by a radio connection, said method comprising:
  implemented by a first relay device situated in an area of radio coverage of the master device:
    receiving a command to simulate the peripheral device originating from a device of the local area network, said peripheral device being situated in an area of radio coverage of a second relay device, said command comprising an identifier of the peripheral device and a MAC address of the peripheral device;
    establishing a radio connection with the master device, the first relay device simulating the presence of the peripheral device in the area of radio coverage of the master device by transmitting a message, said message comprising said identifier and said MAC address, said message advertising the presence of the peripheral device in the area of radio coverage of the master device;
    receiving by means of the radio connection a request to read a value taken by a characteristic managed by the peripheral device, said request being dispatched by the master device to the first relay device;
    receiving said value originating from the second relay device, said second relay device having obtained it by interrogating the peripheral device, and
    dispatching said value to the master device by means of the radio connection.

2. The access method as claimed in claim 1, in which the first relay device receives an identifier of the characteristic, obtained by the second relay device from the peripheral device, and transmits it to the master device by means of the radio connection.

3. The access method as claimed in claim 1, comprising for the second relay device, listening for radio frequencies so as to detect the presence of the peripheral device and advertising of the presence of the peripheral device.

4. The access method as claimed in claim 1, in which the first relay device advertises a presence of a plurality of peripheral devices detected in a service area of a local area network.

5. The access method as claimed in claim 1, in which the first and second relay devices communicate by way of an access gateway of a local area network, said method further comprising a command to one of the first or second relay devices to listen for frequencies, so as to detect a presence of the peripheral device in a service area of the local area network.

6. A first relay device in a local area network, said first relay device being situated in an area of radio coverage of a master device and comprising:
  a processor; and
  a non-transitory computer-readable medium comprising instructions stored thereon, which when executed by the processor configure the first relay device to perform acts comprising:
    receiving a command to simulate the peripheral device originating from a device of the local area network, said peripheral device being situated in an area of radio coverage of a second relay device, said command comprising an identifier of the peripheral device and a MAC address of the peripheral device, and receiving a value taken by a characteristic managed by the peripheral device originating from the second relay device, said second relay device having obtained it by interrogating the peripheral device;
    establishing a radio connection with the master device by simulating the presence of the peripheral device in the area of radio coverage of the master device y transmitting a message, said message comprising said identifier and said MAC address, said message advertising the presence of the peripheral device in the area of radio coverage of the master device, to receive by means of the radio connection a request to read a value taken by the characteristic, said request being dispatched by the master device to the first relay device, and to dispatch the value in return.

7. A system in a local area network, said system comprising a first relay device, said first relay device being situated in an area of radio coverage of a master device and comprising:
  a first processor; and
  a first non-transitory computer-readable medium comprising instructions stored thereon, which when executed by the processor configure the first relay device to perform acts comprising:
    receiving a command to simulate the peripheral device originating from a device of the local area network, said peripheral device being situated in an area of radio coverage of a second relay device, said command comprising an identifier of the peripheral device and a MAC address of the peripheral device, and receiving a value taken by a characteristic managed by the peripheral device originating from the second relay device, said second relay device having obtained it by interrogating the peripheral device;
    establishing a radio connection with the master device by simulating the presence of the peripheral device in the area of radio coverage of the master device by transmitting a message, said message comprising said identifier and said MAC address, said message advertising the presence of the peripheral device in the area of radio coverage of the master device, to receive by means of the radio connection a request to read a value taken by the characteristic, said request being dispatched by the master device to the first relay device, and to dispatch the value in return;
  and a second relay device, said second relay device comprising:
    a second processor; and
    a second non-transitory computer-readable medium comprising instructions stored thereon, which when executed by the processor configure the first relay device to perform acts comprising:

obtaining a value taken by the characteristic;

receiving a request to read a value taken by the characteristic originating from the first relay device and dispatching the value to the first relay device.

8. The system as claimed in claim 7, further comprising communicating between the two relay devices by means of power line currents.

9. The system as claimed in claim 7, further comprising an access gateway, playing a role of intermediary between the two relay devices.

10. A non-transitory computer-readable medium storing a program for a relay device, the program comprising program code instructions intended to control execution of steps of an access method implemented by the relay device, when said program is executed by the relay device, the method of access by a master device to a value taken by a characteristic managed by a peripheral device in a local area network, said master and peripheral devices being able to communicate by a radio connection, said method comprising the following steps implemented by a first relay device situated in an area of radio coverage of the master device:

receiving a command to simulate the peripheral device originating from a device of the local area network, said peripheral device being situated in an area of radio coverage of a second relay device, said command comprising an identifier of the peripheral device and a MAC address of the peripheral device;

establishing a radio connection with the master device, the first relay device simulating the presence of the peripheral device in the area of radio coverage of the master device by transmitting a message, said message comprising said identifier and said MAC address, said message advertising the presence of the peripheral device in the area of radio coverage of the master device;

receiving by means of the radio connection a request to read a value taken by a characteristic managed by the peripheral device, said request being dispatched by the master device to the first relay device;

receiving said value originating from the second relay device, said second relay device having obtained it by interrogating the peripheral device, and dispatching said value to the master device by means of the radio connection.

11. A non-transitory recording medium, readable by a relay device, on which a program for the relay device, comprising program code instructions intended to control execution of steps of an access method implemented by the relay device, when said program is executed by the relay device, the method of access by a master device to a value taken by a characteristic managed by a peripheral device in a local area network, said master and peripheral devices being able to communicate by a radio connection, said method comprising the following steps implemented by a first relay device situated in an area of radio coverage of the master device:

receiving a command to simulate the peripheral device originating from a device of the local area network, said peripheral device being situated in an area of radio coverage of a second relay device, said command comprising an identifier of the peripheral device and a MAC address of the peripheral device;

establishing a radio connection with the master device, the first relay device simulating the presence of the peripheral device in the area of radio coverage of the master device by transmitting a message, said message comprising said identifier and said MAC address, said message advertising the presence of the peripheral device in the area of radio coverage of the master device;

receiving by means of the radio connection of a request to read a value taken by a characteristic managed by the peripheral device, said request being dispatched by the master device to the first relay device;

receiving said value originating from the second relay device, said second relay device having obtained it by interrogating the peripheral device, and dispatching said value to the master device by means of the radio connection.

12. The non-transitory computer-readable medium as claimed in claim 10, in which the first relay device receives an identifier of the characteristic, obtained by the second relay device from the peripheral device, and transmits it to the master device by means of the radio connection.

13. The non-transitory computer-readable medium as claimed in claim 10, further comprising receiving an identifier of the peripheral device and in which, in order to establish a radio connection, the first relay device advertises the presence of the peripheral device in the area of radio coverage of the master device.

14. The non-transitory computer-readable medium as claimed in claim 10, further comprising listening for radio frequencies by the second relay device so as to detect the presence of the peripheral device and an advertising of the presence of the peripheral device.

15. The non-transitory computer-readable medium as claimed in claim 10, in which the first relay device advertises a presence of a plurality of peripheral devices detected in a service area of a local area network.

16. The non-transitory computer-readable medium as claimed in claim 13, in which the first and second relay devices communicating by way of an access gateway of a local area network, said method furthermore comprises a command to one of the relay devices to listen for frequencies, so as to detect a presence of the peripheral device in a service area of the local area network.

* * * * *